M. A. MULRONY.
WIND POWER MOTOR.
APPLICATION FILED SEPT. 3, 1915.
1,266,518. Patented May 14, 1918.
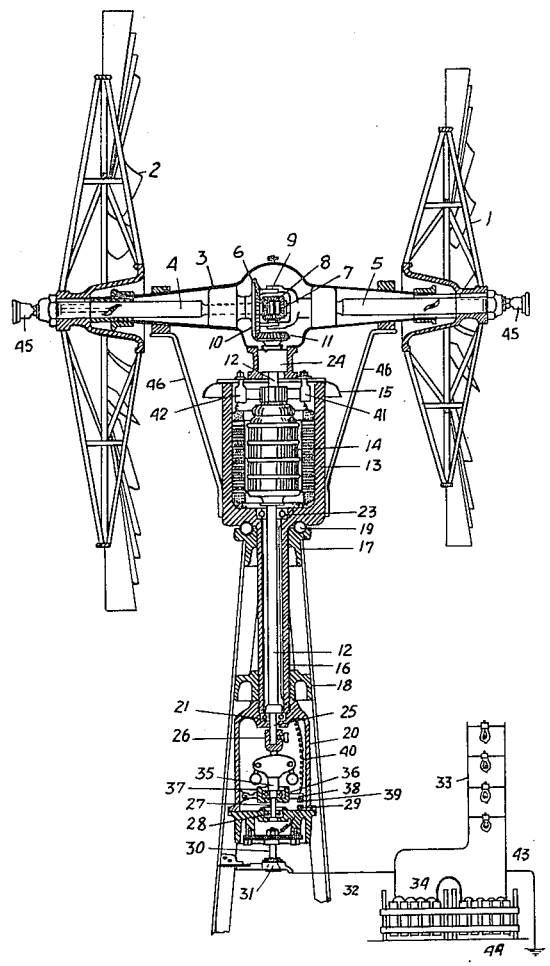
M. A. Mulrony.
Inventor.
By
Attorney.

UNITED STATES PATENT OFFICE.

MARION ALVIN MULRONY, OF RANDWICK, NEAR SYDNEY, NEW SOUTH WALES, AUSTRALIA.

WIND-POWER MOTOR.

1,266,518.  Specification of Letters Patent. Patented May 14, 1918.

Application filed September 3, 1915. Serial No. 48,828.

*To all whom it may concern:*

Be it known that I, MARION ALVIN MULRONY, a citizen of the United States of America, residing at Avoca street, Randwick, near Sydney, New South Wales, Australia, have invented new and useful Improvements in Wind-Power Motors, of which the following is a specification.

This invention relates to windmotors and has for its object to provide an effective form of self governing wind motor operating to deliver power through a rotating shaft.

In a wind motor according to this invention, the rotational speed of the power shaft though not constant or approximately so is ordinarily maintained within a range suitable for the driving of a dynamo, the available power up to a maximum determined by the capacity of the motor being at any time proportional or nearly so to the wind velocity. A wind motor according to my invention is therefore adapted for direct coupling to a dynamo to generate electrical current in amount limited by the dimensions of the motor and the local wind conditions, and it is also adapted for supplying power directly to mechanical apparatus in which it is desirable that the range of speed of the driving shaft shall not exceed a certain predetermined limit. The invention has further for its object the structural improvement of wind motors in certain respects which will be hereinafter described, and particularly to provide a self controlling wind motor direct coupled to a dynamo for the generation of electrical current.

According to my said invention a windmotor consists of two wind wheels, one of greater diameter than the other, and rotatable in parallel vertical planes, said wheels being respectively keyed to shafts which are geared through a "differential" box and transmission gearing to a driving shaft, through which shaft power is transmitted to a dynamo or to a mechanical apparatus. The wheel shafts and the differential gear are supported on a carriage which is rotatable on a vertical axis, so that said shafts and gear may swing around said axis to enable the wheels to face the wind direction or to "feather" more or less off the wind direction. The vanes or sails of said wheels are both pitched in the same direction, so that the differential shafts rotate in the same direction. The smaller wheel always stands up more or less into the wind, the wind pressure on the larger wheel, owing to the superior area of said larger wheel, causing it to act as a tail, so that the wheel shafts normally set in alinement with the wind direction. The rotational movement of the larger wheel, acting through the differential box, reacts on the smaller wheel, tending to retard more or less its normal rate of rotation while power is being absorbed from the driving shaft.

The two wheels, rotating in the same direction, act as a gyroscope, and unless restrained the carriage would "precess" around its axis, causing the wheels to traverse around said axis when rotating at any considerable speed. This tendency to precessional motion of the carriage is opposed by the mechanical reaction of the transmission gearing and it is necessary that said gearing shall be so arranged as to cause that reaction to oppose the direction of gyrostatic precession. The driving shaft, while transmitting all the power delivered from both wind wheels, rotates at a rate which approximates toward a mean between the respective rates of rotation of the larger wheel and the smaller wheel. Under gale conditions the carriage carrying the differential, the wheel shafts, and the wheels, turns so as to bring the wheels more or less off the wind, the reaction of the transmission gearing overbalancing the rotative effort due to gyroscopic action which alone would operate to rotate the carriage oppositely. When the carriage thus rotates, the wheels are swung more or less off the wind and the driving power of the wind on them is proportionately diminished and consequently the rotational speed of the driving shaft is controlled automatically within predetermined limits.

The gyroscopic action of the rotating wheels exerts resistance against rapid change of plane of their rotation and consequently insures slow oscillatory movement of the carriage when the wind direction changes or when the position of the carriage is influenced by the mechanical reaction of the transmission gearing, which reaction tends to make or permit the carriage to move around its axis proportionately to the torque being exerted on the driving shaft.

The angle of presentation of the wheels to the wind is automatically determined by this reaction, which opposes the normal tendency of the wheels to set squarely to the wind direction and also opposes the tendency of the carriage to "precess." If for instance the driving shaft were held, the wind energy absorbed by the wheels would be expended in causing the carriage to turn bodily around its vertical axis until the wheels move more or less off the wind ("feather"), the turning effect diminishing proportionately as this feathering movement progresses. On the other hand, if the resistance of the driving shaft to rotation is relatively small, the reactive effect in the transmission gearing tending to swing the carriage and bring the wheels off the wind is also small, and the wheels will in such case continue to face the wind and maintain their rotation. It is found in practice that in severe gusts the carriage is thus caused sometimes to make a complete rotation, but ordinarily the motion of the carriage is slowly oscillating in response to the balance of opposing directional and rotative forces acting on it.

There are thus two reactive effects always operating while there is any considerable resistance to the rotation of the driving shaft, and there is more or less such resistance while the driving shaft is delivering power. The one of these reactive effects operating through the differential box partially balances the rotative effect of the wind on the two wheels, so that their rates of rotation are caused to differ more or less under any certain wind conditions; this reactive effect upon two wheels is however not essential, though it is a desirable condition, for the effective operation of the motor. The other reactive effect acting on the carriage operates to swing the carriage and bring the wheels off the wind proportionately when the power absorbed from the driving pinion is in excess of a certain rate, or conversely when the power so absorbed is small and the speed of rotation of the wheels rises excessively.

The invention therefore involves means which act to procure two distinct effects. Firstly it provides means whereby the power delivery is approximated toward a constant rate, and secondly, irrespective of speed regulation of the driving shaft, it provides means for "feathering" a wind wheel by setting up a balance between directional and rotative forces acting upon the carriage.

The "feathering" control is dependent not upon the utilization of two wheels of differential power, as it is procurable in a motor having one wheel only, so long as that wheel be carried on that side of the rotational axis of the carriage which is distant from the wind direction as in such case the one wheel will operate not only as a power absorbing element but also as a "tail" for the carriage. The addition of the smaller wheel and the differential gear procures regulation of the speed of the driving shaft. For the generation of electrical power the armature of a dynamo is keyed directly on the driving shaft, and the current generated is stored in a secondary battery which may be used as a store of energy or as a "buffer" battery when the supply main is connected directly to the circuit. A switch operated by a centrifugal governor acts to cut the dynamo out of the circuit when the rate of rotation of the driving shaft is below or in excess of a predetermined range.

The structure of the tower on which the carriage is mounted is not a part of my invention, and there may be substituted for a tower-support of the type indicated in the drawings, any other known base suitable for supporting the carriage and permitting its rotation. The essential structural condition is that the carriage shall be obedient rotatably to the action of the wind on the wheels and to the reactive effects already described, so as to allow the wheels to swing off the wind automatically, means being provided preferably to enable the carriage to be swung manually for the purpose of putting the motor out of action. The respective sail area and respective dimensions and weight of the two wind wheels are factors which, having regard to the functioning of the "differential" gear, determine the speed control of the driving shaft. These constants also affect the gyrostatic action of the wheels and therefore affect the balance of reactive effects which operate to turn the carriage in one direction or the other. Obviously, if the forward wheel were of relatively very small diameter and sail area, its movements would be subservient to the control of the larger and more powerful wheel, so that under heavy wind conditions in which the larger wheel would rotate very rapidly, the forward wheel, owing to its relatively small power, might be turned reversely, if the torque resistance of the driving shaft were considerable. In this case the small wheel might be driven to turn oppositely to the direction due to the normal wind influence on it, and the driving shaft would in this case turn at a rate mean between the rate of positive rotation of the larger wheel and the rate of negative rotation of the smaller wheel. The diameters and sail areas of the wheels should therefore be mutually proportionate and adequate to the power to be taken from the driving shaft having regard to normal wind conditions in the place of use.

In practice I have found that the larger wheel should usually have approximately one-third more power capacity than the smaller wheel, but this proportional difference in dimensions of the two wheels is obviously subject to more or less wide variation, and should bear a relation to the ratio of the transmission gearing, to the torque resistance of the driving shaft, and to the weight diameter and normal speed of the wheels, by which their gyroscopic action is affected.

The accompanying drawing is a sectional elevational view of a wind motor and accessory parts constructed according to my invention, with a dynamo having its armature mounted on the driving shaft and its field magnet structure forming the rotating carriage, the brushes of said dynamo being wired to a storage battery through a centrifugal governor control switch.

1 is the forward wheel, and 2 the rearward wheel; the sails or vanes of these wheels may be constructed and mounted according to any usual practice. A casing 3 carries suitable bearings for the wheel shafts 4 and 5; the inner ends of these shafts carry upon them the opposite bevel gears 6 and 7 forming sun wheels of the differential gear, the planet wheels 8 of which are rotatably carried on the differential rotor 9 in the usual way. The bevel crown wheel 10 fixed on said rotor 9 gears with the bevel pinion 11 on the upper end of the driving shaft 12. Obviously, a worm gearing or a helical gearing may take the place of the bevel gearing shown. The essential structural condition is that the mechanical reaction of the drive must operate to turn the carriage in a direction opposed to the precessional direction of movement thereof due to the rotation of the wheels; consequently the driving element of the transmission gearing must be able to traverse around the driven element of said gearing, and one or other known form of angle gearing, whether bevel, worm or helical must be used between those elements. 13 are field magnets, which form the carriage or rotatable head of the struture, and 14 is an armature which with said field magnets 13 forms a dynamo. 15 is a weather hood. The field magnet casting is constructed with a tubular extension 16 which is rotatable in bearings 17 and 18 fixed in the tower structure. The weight of the carriage is supported on a ball race 19 on the upper bearing 17. The switch box 20 is fixed on the lower end of the extension 16 and carries a lower bearing 21 for the armature shaft 12, said shaft having upper bearings 23 and 24. The tail 25 of the armature shaft 12 drives the centrifugal governor switch through a coupling 26, the lower end of the governor spindle 27 having a bearing 28 in the bottom of the box 20. 29 is a fixed contact insulated from the box 20 and wired to the slip ring 30. A contact sleeve 31 acting on said slip ring 30 is wired (32) to the supply main 33 and the storage battery 34. The governor sleeve 35 acts through a ball race 36 on the carrier 37 which controls a pivoted arm 38 on the end of which is a contact 39 wired (40) to one brush 41 of the dynamo, the other brush 42 of the dynamo being grounded through the frame. The return circuit 43 from the battery or supply main is grounded as indicated diagrammatically at 44. In practice, where convenient, the return wire 43 is connected directly to the frame of the tower. 45 are lubricators. 46 are struts which assist to support the axle casing 3 on the carriage 13.

When mechanical apparatus is required to be driven directly by the motor, the dynamo field magnets and armature, the switch, and the battery equipment described are omitted, and the shaft 12 is direct geared to such mechanical apparatus.

What I claim as my invention and desire to secure by Letters Patent is:—

1. In a wind motor, a head having two shafts, a differential connecting the two shafts, a wheel on each shaft, said wheels constructed to rotate at different speeds, and a driven shaft receiving power from said wheels and driven through said differential at a speed substantially a mean between the speed of the said wind wheels.

2. In a wind motor, a head having wheels constructed to rotate at different speeds, a shaft driven by said wheels, and a differential between the wheels and shaft to compensate for the difference in speed between the different wheels whereby the said shaft is driven at a rate approximately a mean between the speed of the different wheels.

3. In a wind motor, a head having wheels constructed to rotate at different speeds in the same direction, a shaft driven by said wheels, and a differential between the wheels and shaft to compensate for the difference in speed between the wheels whereby the said shaft is driven at a rate approximately a mean between the speed of the different wheels.

4. In a wind motor, a rotatable head having wheels constructed to rotate at different speeds in the same direction, a shaft driven by said wheels, a differential between the wheels and shaft to compensate for the difference in speed between the wheels whereby the said shaft is driven at a speed approximating a mean between the speed of the different wheels, and a driving connection between the differential and said shaft arranged to oppose the gyrostatic precession of said rotary head.

In testimony whereof I have signed my name to this specification in the presence of two subscribing witnesses.

MARION ALVIN MULRONY.

Witnesses:
W. I. DAVIS,
H. C. CAMPBELL.